(12) United States Patent
Philipp et al.

(10) Patent No.: US 11,447,063 B2
(45) Date of Patent: Sep. 20, 2022

(54) STEERABLE SCANNING AND PERCEPTION SYSTEM WITH ACTIVE ILLUMINATION

(71) Applicant: GM GLOBAL TECHNOLOGY OPERATIONS LLC, Detroit, MI (US)

(72) Inventors: Tzvi Philipp, Bet Shemesh (IL); Shahar Villeval, Tel Aviv (IL); Igal Bilik, Rehovot (IL)

(73) Assignee: GM Global Technology Operations LLC, Detroit, MI (US)

( * ) Notice: Subject to any disclaimer, the term of this patent is extended or adjusted under 35 U.S.C. 154(b) by 526 days.

(21) Appl. No.: 16/515,662

(22) Filed: Jul. 18, 2019

(65) Prior Publication Data
US 2021/0016704 A1 Jan. 21, 2021

(51) Int. Cl.
| | |
|---|---|
| *B60Q 1/08* | (2006.01) |
| *G06T 7/70* | (2017.01) |
| *G05D 25/02* | (2006.01) |
| *B60Q 1/00* | (2006.01) |
| *G01S 13/86* | (2006.01) |
| *G01S 13/60* | (2006.01) |
| *G01S 13/931* | (2020.01) |

(52) U.S. Cl.
CPC .............. *B60Q 1/08* (2013.01); *B60Q 1/0023* (2013.01); *G01S 13/60* (2013.01); *G01S 13/867* (2013.01); *G05D 25/02* (2013.01); *G06T 7/70* (2017.01); *G01S 2013/9318* (2020.01)

(58) Field of Classification Search
CPC .......... B60Q 1/0023; B60Q 1/08; G01S 13/60; G01S 13/867; G01S 13/931; G05D 25/02; G06T 7/70
See application file for complete search history.

(56) References Cited

U.S. PATENT DOCUMENTS

| | | | | |
|---|---|---|---|---|
| 7,432,800 B2* | 10/2008 | Harter, Jr. | ............. | B60Q 9/008 |
| | | | | 340/436 |
| 10,649,464 B2* | 5/2020 | Gray | ...................... | G08G 1/166 |
| 10,656,275 B1* | 5/2020 | Bills | ..................... | G01S 7/4817 |
| 10,949,679 B2* | 3/2021 | Ion | ....................... | G05D 1/0246 |

(Continued)

FOREIGN PATENT DOCUMENTS

CN 110036630 A * 7/2019 ....... H01L 27/14605

*Primary Examiner* — Hunter B Lonsberry
*Assistant Examiner* — Daniel L Greene
(74) *Attorney, Agent, or Firm* — Quinn IP Law (57) ABSTRACT

A scanning and perception system for a vehicle camera having an instantaneous field of view (iFOV) and configured to capture an image of an object at a saturation level in the camera's iFOV. The system also includes a light source configured to illuminate the camera's iFOV. The system additionally includes a radar configured to determine the object's velocity and the object's distance from the vehicle, and a mechanism configured to steer the radar and/or the camera. The system also includes an electronic controller programmed to regulate the mechanism and adjust illumination intensity of the light source in response to the saturation level in the image or the determined distance to the object. The controller is also programmed to merge data indicative of the captured image and data indicative of the determined position of the object and classify the object and identify the object's position in response to the merged data.

20 Claims, 4 Drawing Sheets

(56) References Cited

U.S. PATENT DOCUMENTS

| | | | |
|---|---|---|---|
| 2012/0229596 A1* | 9/2012 | Rose | H04N 5/2624 |
| | | | 348/36 |
| 2016/0318437 A1* | 11/2016 | Vilakathara | B60Q 1/143 |
| 2018/0143302 A1* | 5/2018 | Osiroff | G01S 7/497 |
| 2019/0065910 A1* | 2/2019 | Wang | G06T 11/60 |
| 2019/0146511 A1* | 5/2019 | Hurd | G05D 1/0088 |
| | | | 701/27 |
| 2019/0208111 A1* | 7/2019 | Wendel | H04N 5/2258 |
| 2019/0354785 A1* | 11/2019 | Samii | G06N 5/046 |
| 2020/0057450 A1* | 2/2020 | Calleija | G06V 20/582 |

\* cited by examiner

STEERABLE SCANNING AND PERCEPTION SYSTEM WITH ACTIVE ILLUMINATION

INTRODUCTION

The present disclosure relates to a steerable scanning and perception system with active illumination for a motor vehicle.

Vehicular automation involves the use of mechatronics, artificial intelligence, and multi-agent systems to assist a vehicle's operator. Such features and the vehicles employing them may be labeled as intelligent or smart. A vehicle using automation for complex tasks, especially navigation, may be referred to as semi-autonomous. A vehicle relying solely on automation is consequently referred to as robotic or autonomous. Manufacturers and researchers are presently adding a variety of automated functions to automobiles and other vehicles.

Autonomy in vehicles is often categorized in discrete levels, such as Level 1—Driver assistance—where the vehicle may control either steering or speed autonomously in specific circumstances to assist the driver; Level 2—Partial automation—where the vehicle may control both steering and speed autonomously in specific circumstances to assist the driver; Level 3—Conditional automation—where the vehicle may control both steering and speed autonomously under normal environmental conditions, but requires driver oversight; Level 4—High automation—where the vehicle may complete a prescribed trip autonomously under normal environmental conditions, not requiring driver oversight; and Level 5—Full autonomy—where the vehicle may complete a prescribed trip autonomously under any environmental conditions.

Vehicle autonomy requires increasingly sophisticated scanning and perception systems, including various optical equipment and a multitude of sensors to detect objects and other obstacles surrounding the host vehicle, as well as on-board software for interpretation of the captured data. Real-time diagnostics and verification of such equipment and software output may be advantageous for establishing a ground truth—information provided by direct observation, i.e., empirical evidence—regarding vehicle surroundings, and reliable control of the autonomous vehicle.

SUMMARY

A scanning and perception system for a vehicle includes a camera having an instantaneous field of view (iFOV) and configured to capture an image of an object (target) at a saturation level in the camera's iFOV. The system also includes a light source configured to illuminate the camera's iFOV. The system additionally includes a radar configured to determine velocity of the object and distance of the object from the vehicle, and a mechanism configured to steer at least one of the radar and the camera toward the object. The system also includes an electronic controller in electronic communication with and configured to regulate operation of the camera, the light source, the radar, and the mechanism. The electronic controller is programmed to adjust illumination intensity of the light source in response to one of the saturation level in the image and the determined distance of the object to the vehicle. The electronic controller is also programmed to merge data indicative of the captured image of the object and data indicative of the determined velocity of the vehicle and the distance of the object from the vehicle.

The electronic controller is additionally programmed to classify the object and identify a position of the object in response to the merged data.

The electronic controller may be configured to control the radar to scan for and determine the velocity of the object and the distance of the object from the vehicle. The electronic controller may also be configured to subsequently control the mechanism to steer the camera toward the object and the light source to adjust the illumination intensity in response to the determined velocity and the distance of the object. The electronic controller may also be configured to control the camera to capture the image of the object after the illumination intensity is adjusted.

The electronic controller may be configured to control the camera to capture the image of the object prior to controlling the light source to adjust the illumination intensity in response to the saturation level in the image and the mechanism to steer the radar toward the object to determine the velocity of the object and the distance of the object from the vehicle.

The electronic controller may be configured to control the mechanism to steer the radar and the camera toward the object to, respectively, determine the velocity of the object and the distance of the object from the vehicle, and capture the image of the object, prior to controlling the light source to adjust the illumination intensity in response to the determined velocity of the vehicle and the distance of the object from the vehicle.

The light source may be integrated with the camera.

The radar and the camera may be arranged in distant locations on the vehicle. In such an embodiment, the radar, the camera, and the electronic controller may be configured to communicate via a Controller Area Network (CAN) bus or a wireless connection.

The system may additionally include an artificial intelligence (AI) algorithm programmed into the electronic controller and using an artificial neural network. The artificial neural network may be trained to classify the object and identify the position of the object using the data indicative of the image of the object and the data indicative of the velocity of the object and the distance of the object from the vehicle.

The electronic controller may be additionally programmed to operate the vehicle in response to the classification of the object and the identification of the position of the object.

The iFOV of the camera may be in a range of up to 20 degrees.

The electronic controller may be configured to regulate the mechanism and the camera to capture a plurality of images of a terrain, and construct a composite wide or panoramic view of the terrain by combining the plurality of images.

Also disclosed is a method of scanning for and perception of an object via the above-disclosed system arranged on a vehicle.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
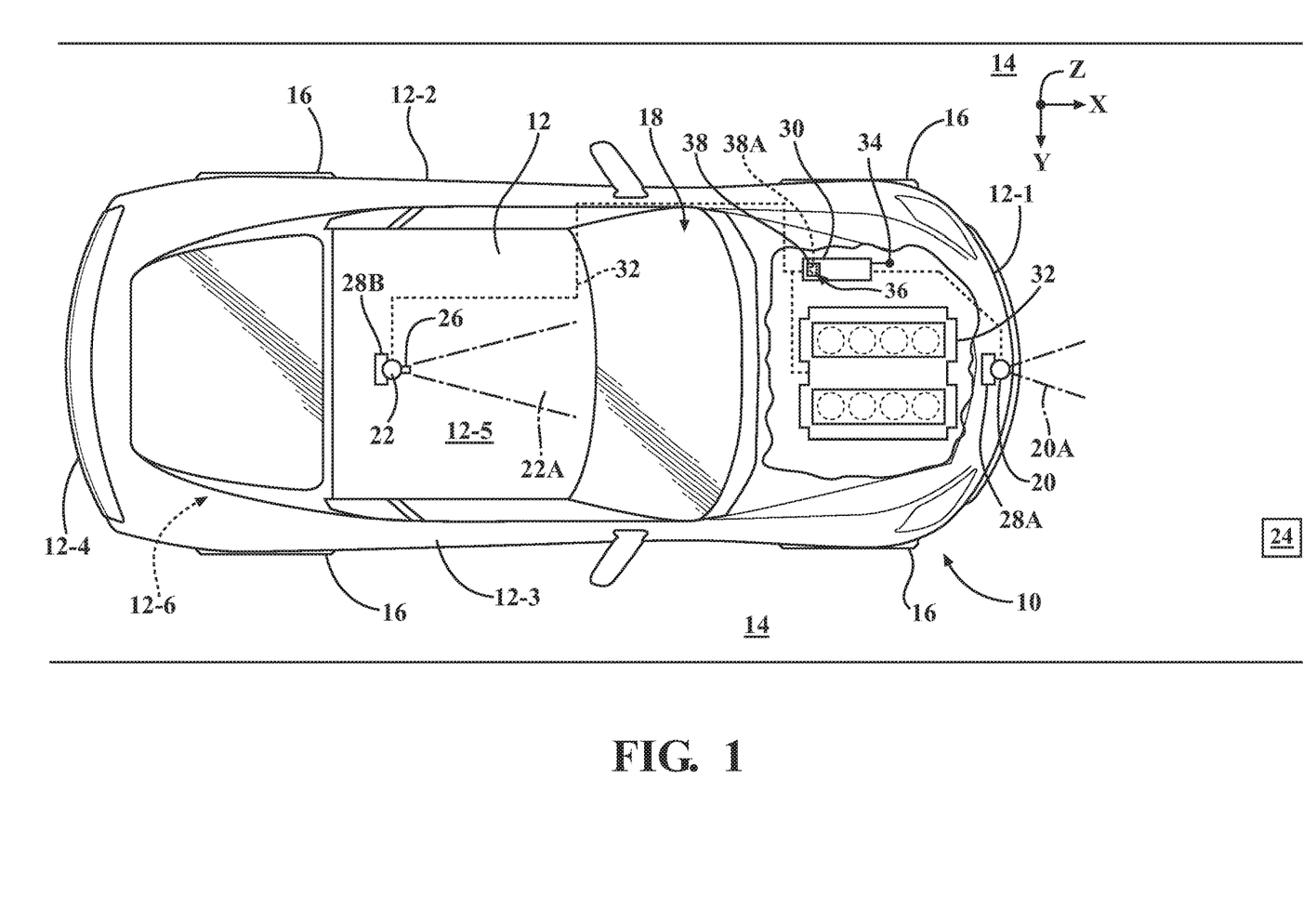
FIG. 1 is a plan view of a motor vehicle situated with respect to a terrain and employing a scanning and perception system having a steerable radar and a camera with active illumination in electronic communication with an electronic controller, according to the present disclosure.

Referring to the drawings, wherein like reference numbers refer to like components, FIG. 1 shows a schematic view of a motor vehicle 10. The motor vehicle 10 may be an autonomous vehicle. The term "autonomous", as used herein, generally refers to the use of mechatronics, artificial intelligence, and multi-agent systems to provide varying levels of assistance to a vehicle's operator in controlling the subject vehicle. Such automation may include the entire range of assistance from the vehicle systems controlling either steering or speed autonomously in specific circumstances to assist the operator up to and including full automation which eschews operator involvement.

As shown, the autonomous motor vehicle 10 has a vehicle body 12. The vehicle body 12 may have a leading side or front end 12-1, a left body side 12-2, right body side 12-3, a trailing side or back end 12-4, a top side or section, such as a roof, 12-5, and a bottom side or undercarriage 12-6. The vehicle 10 may be used to traverse a road surface with respect to a general landscape or terrain 14. The vehicle 10 may include a plurality of road wheels 16. Although four wheels 16 are shown in FIG. 1, a vehicle with fewer or greater number of wheels, or having other means, such as tracks (not shown), of traversing the road surface or other portions of the terrain 14 is also envisioned.

The vehicle 10 uses a scanning and perception system 18 employing mechatronics, artificial intelligence, and a multi-agent system to assist the vehicle's operator. The perception system 18 may employ such features and various sources of data for complex tasks, especially navigation, to operate the vehicle 10 semi-autonomously, or rely solely on automation to operate the vehicle in a robotic or fully autonomous capacity. As shown in FIG. 1, as part of the perception system 18, multiple vehicle sensors are arranged on the vehicle body 12 and used as sources of data to facilitate autonomous operation of the vehicle 10. Such vehicle sensors generally include a radar 20 and a camera 22 mounted to the vehicle body 12, and are shown in FIG. 1. Either the radar 20 or the camera 22 may be mounted to one of the vehicle body sides 12-1, 12-2, 12-3, 12-4, 12-5, and 12-6.

Together, the radar 20 and the camera 22 are steerable independently from the vehicle 10, and configured to scan the terrain 14 for and perceive a target, such as an object 24, positioned external to the vehicle 10. The object 24 may, for example, be a vehicle, a tree, a building, a road or a traffic sign, an animal, or a person. Detection of the representative object 24 may facilitate identification of object type, object position, including velocity V and distance D of the object 24 from the vehicle 10, and object dimensions defining the object's size and shape. Terrain 14 in the vicinity of the vehicle 10 may include multiple objects, such as the object 24 (shown in FIG. 1), information regarding which may be used to assist with mapping the terrain, as well as operation and guidance of the vehicle.

Figure 2:
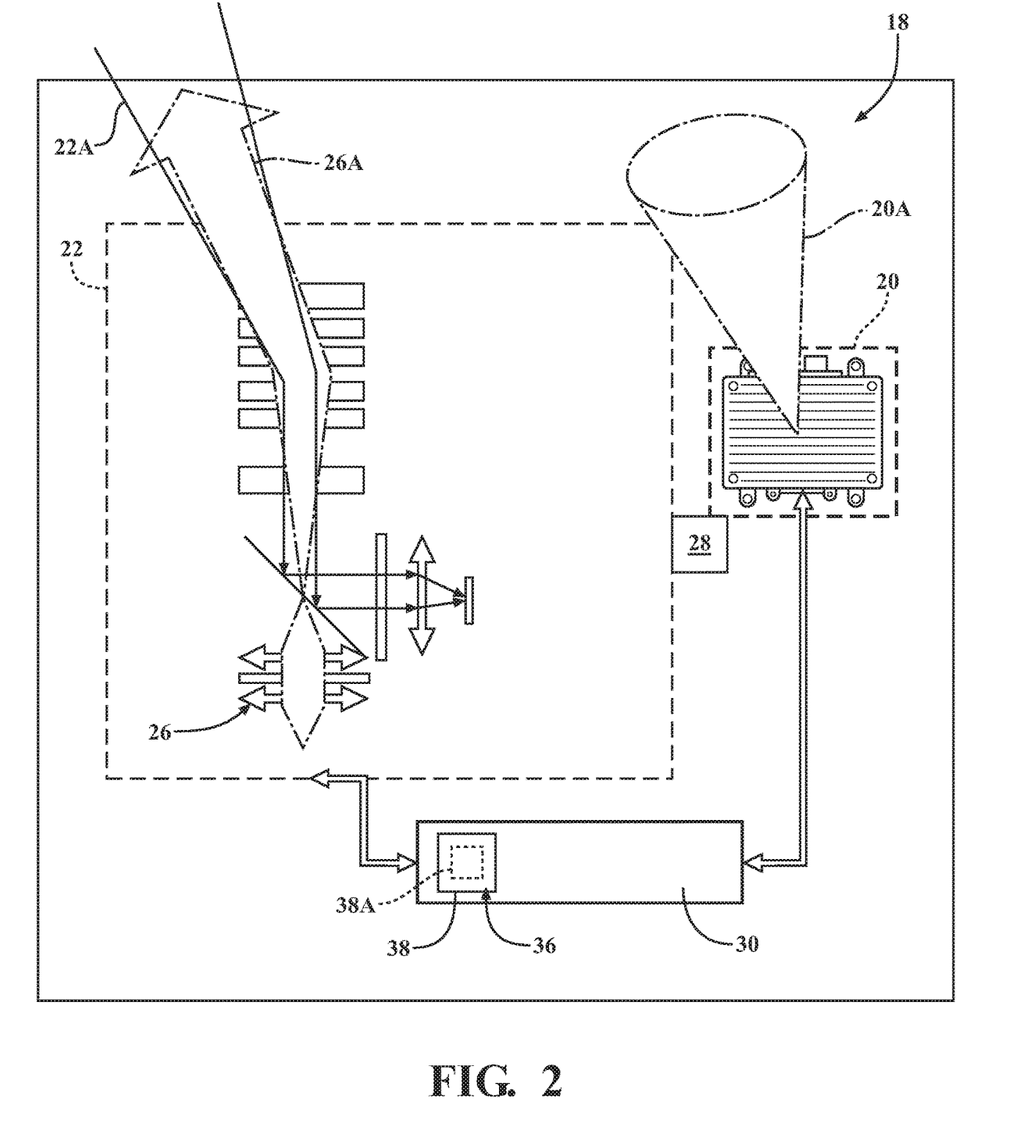
FIG. 2 is a schematic depiction of an embodiment of the scanning and perception system shown in FIG. 1, according to the present disclosure.
Figure 3:
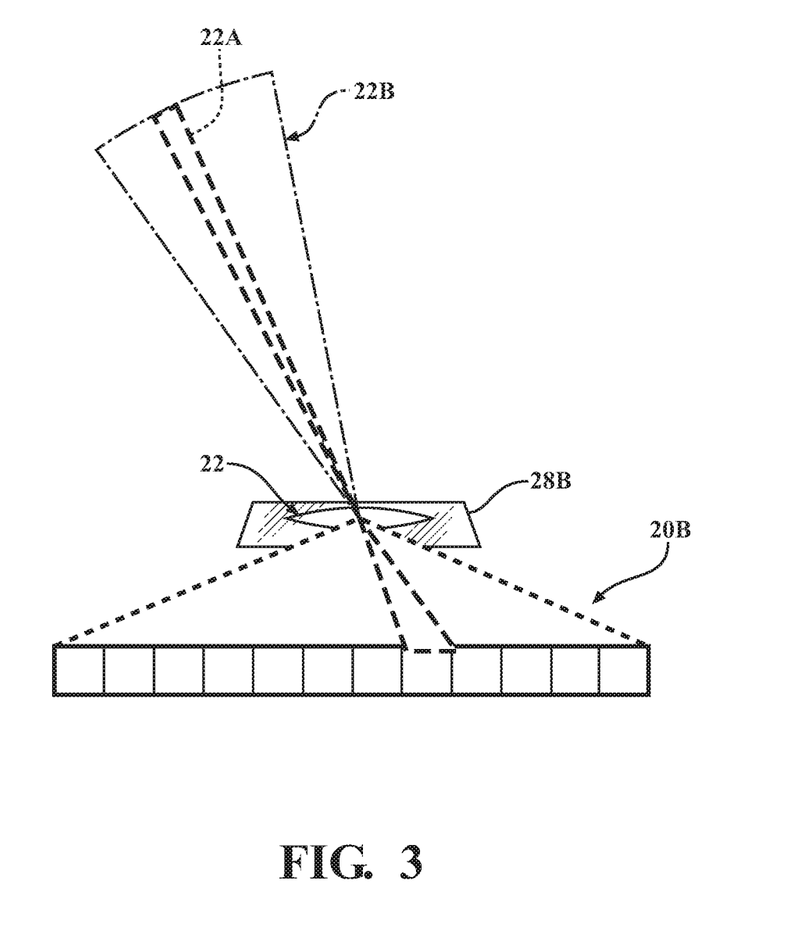
FIG. 3 is a schematic depiction of the scanning and perception system, shown in FIGS. 1 and 2, being shifted through discrete scanning steps to generate a wide view of the terrain, according to the present disclosure, according to the present disclosure.

Generally, a radar, such as the radar 20, is configured to determine the range, angle, and/or velocity of objects using radio waves 20A (shown in FIGS. 1 and 2). A radar employs a transmitter producing electromagnetic waves in the radio or microwave domain, a transmitting antenna, a receiving antenna, and a receiver. Radio waves sent out by the transmitter reflect off the object to the receiver. A processor is typically used to determine properties of the object in response to the captured radio waves. The radar 20 is configured to determine the velocity V of the object 24 and the distance D of the object from the vehicle 10. Generally, a camera, such as the camera 22, is an optical instrument configured to capture still images or to record moving images, which are stored in a physical medium, such as in a digital system or on photographic film. A camera typically employs a lens configured to focus light from the image, and a camera body housing a light sensor and image capture mechanism 20B (shown in FIG. 3). The camera 22 is configured to capture an image of the object 24 in the camera's instantaneous field of view (iFOV) 22A (shown in FIGS. 1 and 2). The iFOV of the camera 22 may be in a range of up to 20 degrees.

The iFOV is generally defined as a concrete effective viewing angle through which a particular camera is sensitive to electromagnetic radiation in a specific instant. Because an image captured by a camera has a finite number of pixels, narrowing the iFOV in a specific camera permits resolution of the captured image to be increased. The quality of the captured image is also dependent on the degree of exposure of the camera's sensor to light and consequent saturation level of the sensor. Accordingly, the saturation level of the sensor, and, therefore, the quality of the captured image, is highly dependent on the camera's adjustment to ambient lighting. Additionally, the quality of the captured image may be enhanced by supplemental illumination, especially in low ambient light conditions.

As shown in FIGS. 1 and 2, the system 18 also includes a light source 26 configured to illuminate the iFOV 22A of the camera 22. The light source 26 may generate a laser beam 26A (shown in FIG. 2) to provide such illumination. The laser beam 26A may have a wavelength in the range of 900 to 1,600 nanometers (nm), which is outside the range of visible light, but effective in illuminating the camera's iFOV 22A with minimal detrimental impact from inclement conditions and ambient lighting. A suitable camera sensor may also be selected, i.e., matched to the selected wavelength of the laser beam 26A. The light source 26 may be integrated with or into the camera 22. Accordingly, such an integrated light source 26 may be steerable together with the camera 22 independently from and relative to the vehicle 10.

The system 18 additionally includes a mechanism 28 (shown in FIG. 2) configured to steer the radar 20 and/or the camera 22 toward the object 24. As shown in FIG. 1, the mechanism 28 may include separate respective actuators 28A and 28B, such as individual electric motors, configured to shift or reposition the radar 20 and the camera 22. By steering the camera 22 toward the object 24, the mechanism 28 permits usage of the camera 22 with a purposefully restricted or narrow iFOV 22A specifically intended to enhance or optimize resolution of the captured image(s) of the object 24. Thus, the mechanism 28 permits the radar 20 and/or the camera 22 to focus on a narrower section of the terrain 14, while maintaining optimized resolution of the captured image. Additionally, the mechanism 28 steers the laser beam 26A as part of the camera 22 to provide active illumination of the camera's iFOV 22A. Furthermore, individual captured images may be combined or stitched together to generate a wide view of the terrain 14, while retaining the enhanced resolution.

As shown in FIG. 1, the system 18 also includes a programmable electronic controller 30 arranged on the autonomous vehicle 10. The electronic controller 30 is in communication with the radar 20, the camera 22, the light source 26, and the mechanism 28. The radar 20 and the camera 22 may be arranged proximate to one another on the vehicle body 12 and in communication with the electronic controller 30 via a wired connection and steered via the mechanism 28. Alternatively, the radar 20 and the camera 22 may be arranged in distant locations relative to one another on the vehicle 10 and steered via separate respective actuators 28A, 28B. In such an embodiment, the radar 20, the camera 22, and the electronic controller 30 may be configured to communicate via a wired data network 32, e.g., a Controller Area Network (CAN) bus. Alternatively, the radar 20, the camera 22, and the electronic controller 30 may be configured to communicate via a wireless connection 34.

The controller 30 includes a memory that is tangible and non-transitory. The memory may be a recordable medium that participates in providing computer-readable data or process instructions. Such a medium may take many forms, including but not limited to non-volatile media and volatile media. Non-volatile media used by the controller 30 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 30 may also include a flexible disk, hard disk, magnetic tape, other magnetic medium, a CD-ROM, DVD, other optical medium, etc. The controller 30 may be equipped with a high-speed primary clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 30 or accessible thereby may be stored in the memory and automatically executed to provide the required functionality.

The controller 30 may be configured, i.e., structured and programmed, to receive and process from the radar 20 and the camera 22, data indicative of the determined velocity V and distance D of the object 24 to the vehicle 10 and data indicative of the captured image(s) of the object 24. The controller 30 is specifically programmed with perception software 36 that may include an artificial intelligence (AI) algorithm 38 configured to assess incoming data from the radar 20 and the camera 22. The perception software 36 would be generally configured to analyze and interpret the data captured by the radar 20 and the camera 22. For example, the perception software 36 may be configured to identify the object 24 and define positioning of the object in the X-Y-Z coordinate system (shown in FIG. 1). The perception software 36 may also be configured to determine the saturation level in the captured image(s). Additionally, the artificial intelligence (AI) algorithm 38 may use an artificial neural network 38A. The artificial neural network 38A may be trained to classify the object 24, i.e., determine the object size and type, and identify the position of the object using the data indicative of the image(s) of the object and the data indicative of the object's velocity V and the distance D.

The perception software 36 programmed into the electronic controller 30 is also configured to regulate operation of the mechanism 28, The perception software 36 is additionally configured to adjust illumination intensity of the light source 26 in response to the saturation level in the captured image(s) or to the determined distance D to the object 24, to thereby optimize resolution of the image(s). The perception software 36 is further configured to merge or fuse data indicative of the captured image(s) of the object, received from the camera 22, and data indicative of the determined object's velocity V and the distance D, received from the radar 20. Using the merged data from the radar 20 and the camera 22, the perception software 36 is moreover configured to classify the object 24 and identify the object position relative to the vehicle 10.

Fusion of the radar 20 and camera 22 data may be achieved using various methods or technique. The following is a nonlimiting list of examples of such techniques. In a "Kalman filter" method, the target may be tracked over a period of time based on data from both the radar 20 and the camera 22, and the data may be compared to a vehicle motion model. In an "Optical flow" method, the gradient in object motion for each of the radar 20 and the camera 22 may be matched and compared to validate the same progression in space and time. In a "Nearest neighbor" model, the position of detection from the radar 20 and the camera 22 may be matched to cross-validate the estimation of the object in space before detection. Data fusion may also be accomplished via cross-corelating the likelihood of object in space in each modality, i.e., the radar 20 and the camera 22, by creating a joint likelihood map or comparing the independent sensor maps. The neural network 38A may be configured to receive inputs from each of the radar 20 and the camera 22, and trained to identify objects in both modalities simultaneously.

The electronic controller 30 may be programmed to regulate the mechanism 28 and the camera 22 to capture a plurality of successive images of the terrain 14 at the iFOV 22A. Furthermore, the electronic controller 30 may be programmed to digitally construct a composite panoramic, i.e., wide, view of the terrain by combining the subject images into an overall camera field of view (FOV) 22B (shown in FIG. 3). Accordingly, the FOV 22B is approximately the sum of the number of discrete iFOV's 22A in the scanning and perception system 18. The resultant composite wide view of the terrain 14 may range from 40 to 90 degrees. In the case of an autonomous vehicle 10, the electronic controller 30 may be additionally programmed to operate the vehicle in response to the classification of the object 24 and the identification of the object's position. To such an end, the controller 30 may be further programmed to regulate operation of the mechanism 28, as well as the radar 20, the camera and the light source 26 via a particular scanning and perception strategy or process flow.

According to a first scanning and perception strategy, the controller 30 may be configured to initially, prior to steering the camera 22, steer the radar 20 toward the object 24 via the mechanism 28. Steering the radar 20 toward the object 24 permits the radar to scan for and determine the velocity V of the object and the distance D of the object from the vehicle 10. Following the determination of the velocity V of the object 24 and the object's distance D from the vehicle 10, the electronic controller 30 may then use the subject velocity and distance data to steer the camera 22 via the mechanism 28 toward the object 24. Additionally, the electronic controller 30 may adjust intensity of illumination of the iFOV 22A by the light source 26 using the subject velocity and distance data. The electronic controller 30 may also be configured to control the camera 22 to capture the image(s) of the object 24 after the illumination intensity is adjusted and merge the captured image(s) with the velocity V and distance D data to identify position of the object 24 and classify the object. Following the merging the image(s) with velocity V and distance D data, the controller 30 may shift the radar 20 and the camera 22 to another discrete scanning step at the iFOV 22A to subsequently generate a wide view of the terrain 14.

According to a second scanning and perception strategy, the controller 30 may be configured to initially operate the mechanism 28 to steer the camera 22 toward the object 24 prior to steering the radar 20 via the mechanism. The electronic controller 30 is also configured to trigger the camera 22 to capture the image(s) of the object 24. Following the capturing the image, the electronic controller 30 may then adjust the illumination intensity by the light source 26 in response to the saturation level in the captured image(s). Then, in response to captured image with optimized illumination intensity, the electronic controller 30 may operate the mechanism 28 to steer the radar 20 toward the object 24 to determine the velocity V of the object and the object's distance D from the vehicle 10. The controller may further merge the captured image(s) with the velocity V and distance D data to identify position of the object 24 and classify the object. Following the merging of the data, the controller 30 may shift the radar 20 and the camera 22 to another discrete scanning step using the iFOV 22A to subsequently generate the wide view of the terrain 14 using the overall FOV 22B.

According to a third scanning and perception strategy, the electronic controller 30 may be configured to initially steer the radar 20 together with the camera 22 toward the object 24 via the mechanism 28. Thus, the controller 30 may, substantially concurrently, determine the velocity V of the object 24 and the distance of the object to the vehicle 10 and capture the image(s) of the object. After the velocity V of the object 24 and the distance of the object to the vehicle 10 is determined and the image of the object is captured, the illumination intensity is adjusted via the light source 26 in response to the determined object's velocity V and distance D from the vehicle 10. The controller 30 may also merge the captured image(s) and the velocity V and distance D data to identify position of the object 24 and classify the object. Following merging of the data, the controller 30 may shift the radar 20 and the camera 22 to another discrete scanning step to subsequently generate a wide view of the terrain 14.

Figure 4:
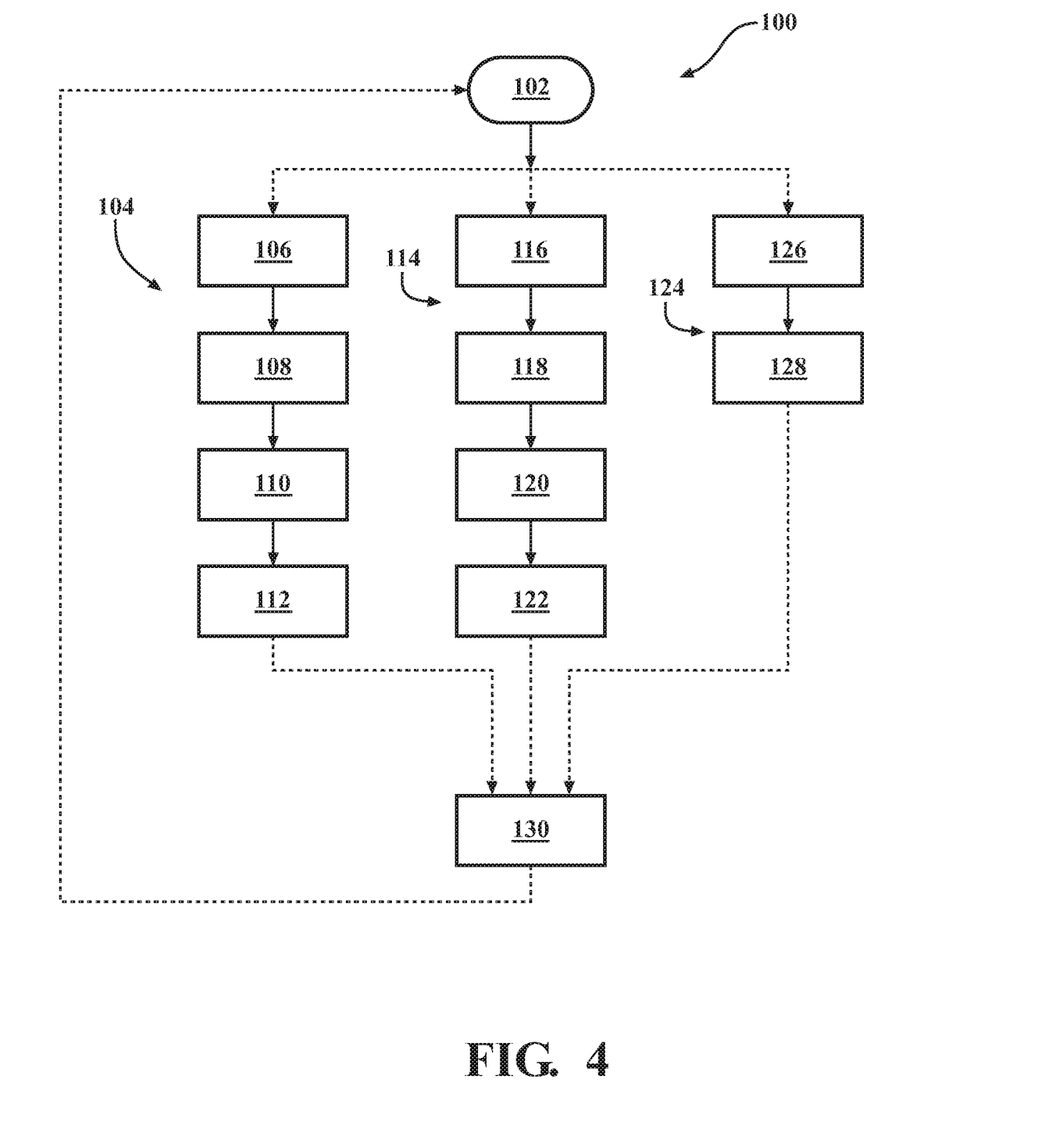
FIG. 4 is a flow diagram of a method of scanning for and perception of an object via the system shown in FIGS. 1-3, according to the present disclosure.

FIG. 4 depicts a method 100 of scanning for and perception of the object 24 situated in the terrain 14, as described above with respect to FIGS. 1-3. The method 100 may be performed via the electronic controller 30 including the perception software 36 and programmed with appropriate algorithms. The method 100 initiates in frame 102 with the vehicle 10 situated relative to or physically traversing the terrain 14 that, for example, includes the object 24. Following frame 102, the method proceeds to one of blocks 104, 114, and 124. In each of the blocks 104, 114, and 124, the method includes capturing an image of the object in the camera's iFOV 22A, illuminating, via the light source 26, the camera's iFOV 22A, determining, via the radar 20, velocity V of the object 24 and distance of the object from the vehicle 10, and steering, via the mechanism 28, the radar 20 and/or the camera 22 toward the object 24.

In each of the blocks 104, 114, and 124 the method also includes adjusting, via the electronic controller 30, illumination intensity of the light source 26 in response to either the saturation level in the image and the determined distance D of the object 24 from the vehicle 10 to optimize resolution of the image. In each of the blocks 104, 114, and 124 the method additionally includes merging, via the electronic controller 30, data indicative of the captured image of the object 24 and data indicative of the determined velocity V and distance D of the object 24 from the vehicle 10. In each of the blocks 104, 114, and 124 the method further includes classifying the object 24 and identifying a position of the object, via the electronic controller 30, in response to the merged data. Classifying the object 24 and identifying the position of the object may be accomplished via the AI algorithm 38, such as using the artificial neural network 38A.

In block 104, the method includes frame 106, where the method initiates scanning for determining the velocity V of the object 24 and the object's distance D from the vehicle 10 via the radar 20. After frame 106, the method proceeds to frame 108, where the method includes steering the camera 22 via the mechanism 28 toward the object 24. Following frame 108, the method moves to frame 110 for adjusting illumination intensity of the light source 26 to optimize illumination of the camera's iFOV 22A and the saturation level in the captured image in response to the object's determined velocity V and the distance D. After frame 110, the method advances to frame 112, where the method includes capturing the image of the object 24 via the camera 22 and includes merging the captured image and the velocity V and distance D data to classify the object 24.

In block 114, the method includes frame 116, where the method initiates triggering the camera 22 to capture the image of the object 24. After frame 116, the method proceeds to frame 118, where the method includes adjusting the illumination intensity of the light source 26 in response to the saturation level in the captured image. Following frame 118, the method moves to frame 120 for steering the radar 20 toward the object 24 to determine the object's velocity V and the object's distance D from the vehicle 10. After frame 120, the method advances to frame 122, where the method includes capturing the image of the object 24 via the camera 22 and includes merging the captured image and the velocity V and distance D data to classify the object 24.

In block 124, the method includes frame 126, where the method initiates steering the radar 20 and the camera 22 toward the object 24 via the mechanism 28. Accordingly, in frame 126, the method includes determining the object's velocity V and distance D from the vehicle 10, and capturing the image of the object 24. In frame 126, the method includes adjusting the illumination intensity of the light source 26 in response to the determined object's velocity V and distance D from the vehicle 10. After frame 126, the method proceeds to frame 128, where the method includes merging the captured image and the velocity V and distance D data to classify the object 24.

After either of the frames 112, 122, and 128, the method may proceed to frame 130 for operating the vehicle 10 in response to and using the classification of the object 24 and the identified position of the object. Following the frame 130, the method may return to frame 102, and from there proceed to one of the blocks 104, 114, and 124 to capture image(s) of other object(s) in the camera's iFOV 22A, illuminating the iFOV 22A, determining velocity V and distance of the object(s) from the vehicle 10, and steering the radar 20 and/or the camera 22 toward the object(s).

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A scanning and perception system for a vehicle, comprising:
    a camera having an instantaneous field of view (iFOV), and configured to capture an image of an object at a saturation level in the iFOV;
    a light source configured to illuminate the iFOV;
    a radar configured to determine velocity of the object and distance of the object from the vehicle;
    a mechanism configured to steer at least one of the radar and the camera toward the object; and
    an electronic controller in electronic communication with and configured to regulate operation of the camera, the light source, the radar, and the mechanism, and programmed to:
        adjust illumination intensity of the light source in response to one of the saturation level in the captured image and the determined distance of the object to the vehicle;
        merge data indicative of the captured image and data indicative of the determined velocity and distance; and
        classify the object and identify a position of the object in response to the merged data.

2. The system according to claim 1, wherein the electronic controller is configured to control the radar to determine the velocity and distance prior to controlling the mechanism to steer the camera toward the object and the light source to adjust the illumination intensity in response to the determined velocity and distance, and capture the image of the object via the camera after the illumination intensity is adjusted.

3. The system according to claim 1, wherein the electronic controller is configured to control the camera to capture the image of the object prior to controlling the light source to adjust the illumination intensity in response to the saturation level in the image and the mechanism to steer the radar toward the object to determine the velocity and distance.

4. The system according to claim 1, wherein the electronic controller is configured to control the mechanism to steer the radar and the camera toward the object to, respectively, determine the velocity and distance and capture the image of the object, prior to controlling the light source to adjust the illumination intensity in response to the determined velocity and distance.

5. The system according to claim 1, wherein the light source is integrated with the camera.

6. The system according to claim 1, wherein the radar and the camera are arranged in distant locations on the vehicle, and wherein the radar, the camera, and the electronic controller are configured to communicate via one of a Controller Area Network (CAN) bus and a wireless connection.

7. The system according to claim 1, wherein the iFOV of the camera is in a range of up to 20 degrees.

8. The system according to claim 1, wherein the electronic controller is configured to regulate the mechanism and the camera to capture a plurality of images of a terrain, and construct a composite panoramic view of the terrain by combining the plurality of images.

9. The system according to claim 1, further comprising an artificial intelligence (AI) algorithm programmed into the electronic controller and using an artificial neural network, wherein the artificial neural network is trained to classify the object and identify the position of the object using the data indicative of the image of the object and the data indicative of the velocity of the object and the distance of the object from the vehicle.

10. The system according to claim 9, wherein the electronic controller is additionally programmed to operate the vehicle in response to the classification of the object and the identification of the position of the object.

11. A method of scanning for and perception of an object from a vehicle, the method comprising:
    capturing, via a camera having an instantaneous field of view (iFOV), an image of an object at a saturation level in the iFOV;
    illuminating, via a light source, the iFOV;
    determining, via a radar, velocity of the object and distance of the object from the vehicle;
    steering, via a mechanism, at least one of the radar and the camera toward the object;
    adjusting, via an electronic controller in electronic communication with and configured to regulate operation of the camera, the light source, the radar, and the mechanism, illumination intensity of the light source in response to one of the saturation level in the image and the determined distance of the object from the vehicle to optimize resolution of the image;
    merging, via the electronic controller, data indicative of the captured image of the object and data indicative of the determined velocity and distance; and
    classifying the object and identifying a position of the object, via the electronic controller, in response to the merged data.

12. The method according to claim 11, further comprising determining the velocity of the object and the distance of the object from the vehicle via the radar prior to steering the camera via the mechanism toward the object and adjusting the illumination intensity by the light source in response to the determined velocity and the distance of the object, and capturing the image of the object after adjusting the illumination intensity of the light source.

13. The method according to claim 11, further comprising triggering the camera to capture the image of the object prior to adjusting the illumination intensity by the light source in response to the saturation level in the image and steering the radar toward the object to determine the velocity and distance.

14. The method according to claim 11, further comprising steering the radar and the camera toward the object to, respectively, determine the velocity of the object and the distance of the object from the vehicle, and capture the image of the object, prior to adjusting the illumination intensity of the light source in response to the determined velocity and distance.

15. The method according to claim 11, wherein the light source is integrated with the camera.

16. The method according to claim 11, wherein the radar and the camera are arranged in distant locations on the vehicle, further comprising communicating between the radar, the camera, and the electronic controller via one of a Controller Area Network (CAN) bus and a wireless connection.

17. The method according to claim 11, wherein the iFOV of the camera is in a range of up to 20 degrees.

18. The method according to claim 11, further comprising regulating, via the electronic controller, the mechanism and the camera to capture a plurality of images of a terrain, and constructing, via the electronic controller, a composite panoramic view of the terrain by combining the plurality of images.

19. The method according to claim 11, wherein the electronic controller is programmed with an artificial intelligence (AI) algorithm using an artificial neural network trained to classify the object and identify the position of the object using the data indicative of the image of the object and the data indicative of the velocity of the object and the distance of the object from the vehicle, further comprising classifying the object and identifying the position of the object via the trained artificial neural network.

20. The method according to claim 19, further comprising operating the vehicle, via the electronic controller, in response to the classifying of the object and identifying the position of the object.

\* \* \* \* \*